Figure 4:
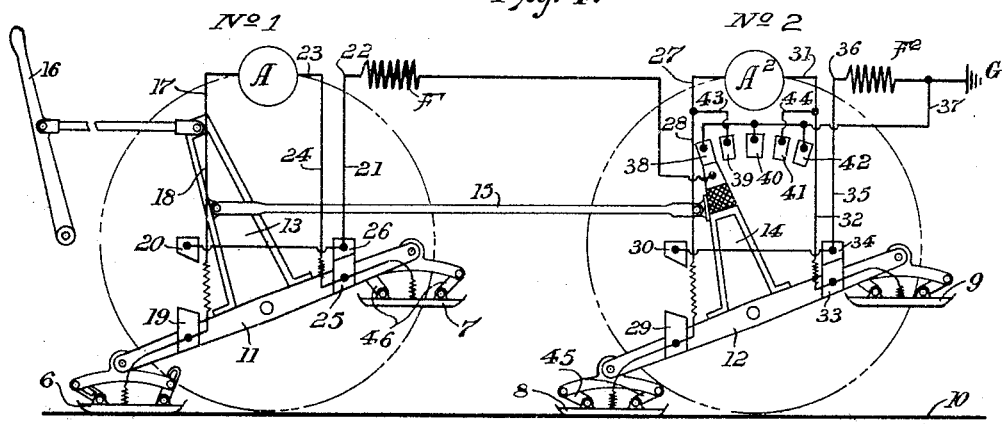

No. 780,055. PATENTED JAN. 17, 1905.
F. C. NEWELL.
ELECTRICAL CONTROLLING APPARATUS.
APPLICATION FILED MAY 5, 1902.
2 SHEETS—SHEET 1.
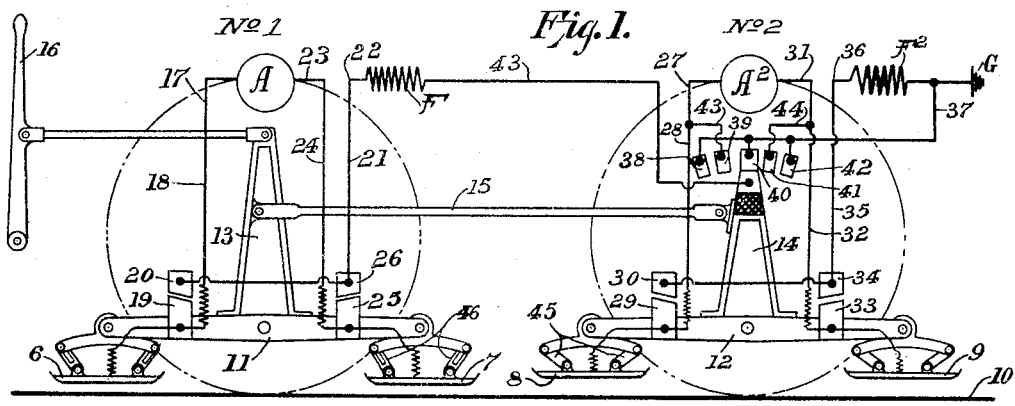
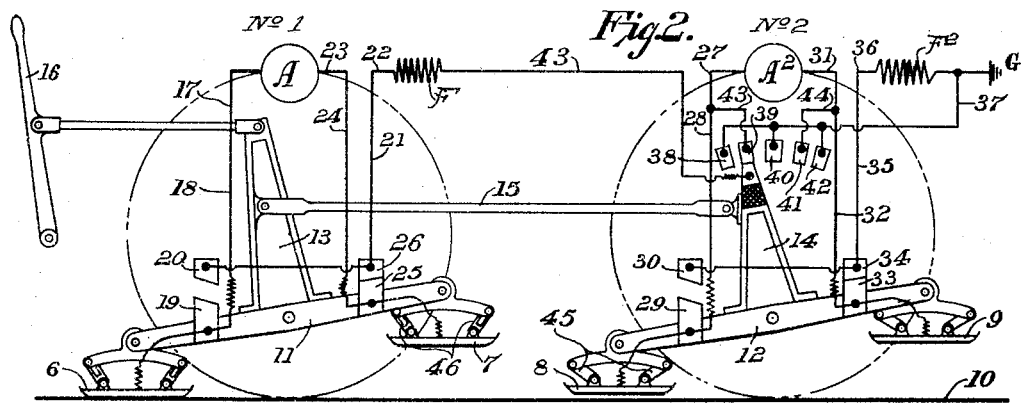
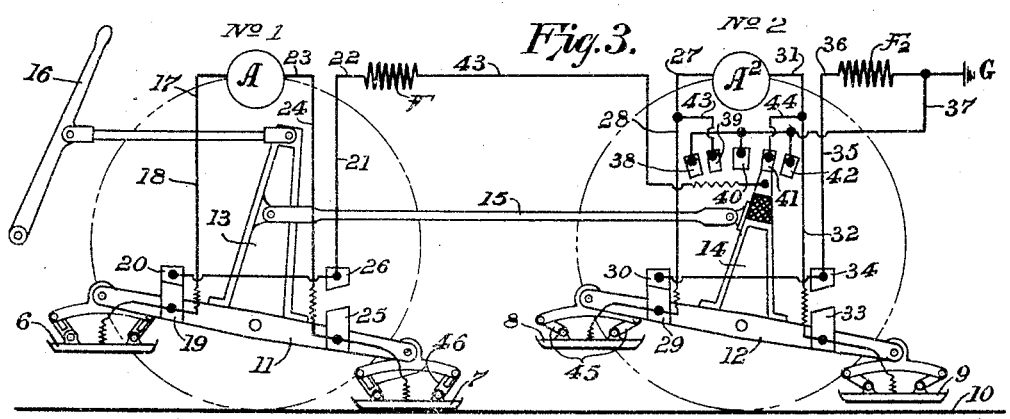
Witnesses:
Cyril C. Crick
F. W. H. Clay
Inventor,
Frank C. Newell.
per
Paul Synnestvedt
Atty.

No. 780,055. PATENTED JAN. 17, 1905.
F. C. NEWELL.
ELECTRICAL CONTROLLING APPARATUS.
APPLICATION FILED MAY 5, 1902.

2 SHEETS—SHEET 2.

Witnesses;
Cyril C. Crick
F. W. H. Clay

Inventor;
Frank C. Newell
per
Paul Synnestvedt
Atty.

No. 780,055.

Patented January 17, 1905.

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTRICAL CONTROLLING APPARATUS.

SPECIFICATION forming part of Letters Patent No. 780,055, dated January 17, 1905.

Application filed May 5, 1902. Serial No. 105,996.

*To all whom it may concern:*

Be it known that I, FRANK C. NEWELL, a citizen of the United States of America, residing in Wilkinsburg, in the county of Allegheny and State of Pennsylvania, have invented certain new and useful Improvements in Electrical Controlling Apparatus, of which the following, taken in connection with the accompanying drawing, is a specification.

The first of the objects of this present invention, is to make it possible to dispense with the ordinary form of controller and complicated mechanism coöperating therewith, and to get all of the apparatus required for the control of the motors on a moving car, outside of the car, so that no current will have to go into or through the car, as is the case in the present forms of device.

Another object of this improvement is, to make it possible to have all of the arcing which occurs take place outside of the car and at the rail, where the movement of the car and the circulation of the air serves to dissipate the arc, at least to a large extent.

A further object of this invention is the provision of such controlling apparatus as will make it possible to have the current or contact broken in the first instance between a contacting shoe and rail, and afterward between the contact switches, which latter are therefore protected against any arcing or destructive action due to the same.

A further object of the present invention is to provide in combination with a car and the motor or motors thereof, and means for maintaining a constant direction of current through the fields while reversing the current in the armature, a collector rail, or conductor, and two collectors, provided with means for securing contact of such collectors in alternation, when it is desired to run the car forward or backward, without the employment of other or supplemental controlling mechanism carried on the platform of the car.

Still another object of the invention is to provide a collector rail and car in combination with two motors for the car, and four collectors constructed so that by the manipulation of the said collectors relative to the collector rail, the motors may be commutated so as to act either in series or multiple, and may be caused to drive the car either forward or backward, as may be required.

The above, as well as such other objects as may hereinafter appear, I attain by means of a construction which I have diagrammatically illustrated in the accompanying drawing, in which—

Figure 5:
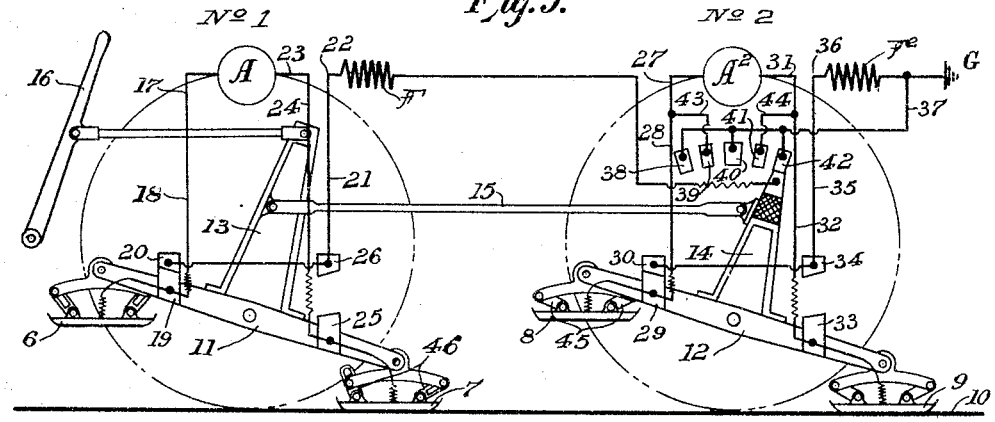

Figure 1 is an elevation showing the apparatus as applied to a car, employing two motors, with the parts in the off or middle position, Figure 2 shows the parts in position to cause the motors to be coupled in series, and the car to move forward, Figure 3 shows the motors still in series, with the car moving backward, Figure 4 shows the motors in multiple, with the car moving forward, and Figure 5 shows the motors in multiple, with the car moving backward.

In carrying out my invention I provide adjacent to the truck or other convenient part of the car a number of collectors or collector shoes, which I have marked 6, 7, 8, and 9, which shoes are arranged to co-operate with a collector rail indicated by the line 10, and are held in suspension, the ones marked 6 and 7 by an oscillating lever 11, and the ones marked 8 and 9 by another oscillating lever 12, constructed to be actuated by means of the respective projecting arms 13 and 14, which are coupled together by means of the tie-rod 15, and receive their movement through the hand lever 16, as shown.

The armature of the No. 1 motor is marked A and the field F, and that of the No. 2 motor is marked $A^2$ and the field $F^2$, while the ground connection is indicated at G.

The armature lead 17 of the No. 1 motor A is connected by means of the wire 18 with the collector shoe 6, the wire 18 having contact at one place in its length with the blade 19 of a switch, the other blade 20 whereof is connected by means of a wire 21 to the lead 22 of the field F. The other lead 23 of the armature is connected by means of a wire 24 to the collector shoe 7, the wire 24 being also in contact with the blade 25 of a switch, the other blade 26 of which is also connected by the wire 21 with the lead 22 of the field F.

The armature lead 27 of the No. 2 motor is connected with the contact shoe 8, and also has an intermediate connection to the blade 29 on a switch, the other blade 30 of which is connected with the field of the No. 2 motor. The armature lead 31 of the No. 2 motor is connected with the contact shoe 9, as shown, and the connection is also provided with contacts at the blade 33 of a switch, the other blade 34 whereof is connected, together with the blade 30, by means of the wire 35 to the lead 36 of the field $F^2$ of the No. 2 motor. The other lead of the field $F^2$ is connected by a wire 37 to three fixed contacts 38, 40, and 42 of a switch, the moving arm whereof is carried by the rocking-arm 14, and which switch also has a fixed contact point 39, leading to the connecting wire 28 by means of the wire 43 and thence to contact shoe 8, and a contact point 41 which, by means of the wire 44 connects with the wire 32 leading to the armature lead 31, and the contact shoe 9.

The movable contact which co-operates with the fixed contacts 38 to 42 inclusive, is connected by means of the wire 43 with the field F of the No. 1 motor, as shown.

It is to be observed that the shoes 8 and 9 are carried by links 45, which permit a limited range of movement vertically of said shoes, sufficient to maintain good contact but the shoes 6 and 7 are carried by links which are provided with slotted openings 46, that serve, after the shoes are in contact with the rail to permit a still further downward movement of either one end or the other of the oscillating lever 11, without affecting the contact position of the shoes on the rail. When hanging in normal position, as indicated in Figure 1, the shoes 6 and 7 therefore hang lower than the shoes 8 and 9, so that for a given amount of movement of the handle 16 the shoes 6 or 7, whichever may be the direction of movement of the handle 16, will make contact with the rail before the shoes 8 and 9. Because of the slotted openings 46, a further movement of the lever 16 in either direction after the shoes 6 or 7 are in contact, will then bring the shoes 8 and 9 in contact, as indicated in Figures 4 and 5.

The operation of my invention is substantially as follows:

Assuming the parts to be first in the position shown in Figure 1, in which all of the shoes are out of contact with the collector rail 10, and that it be desired to move the car forward with the motors in series connection, the handle 16 is moved to the first forward position, as shown in Figure 2, which brings the shoe 6 in contact with the collector rail, picking up current by the wire 18, which then passes through the armature A, and by means of the contact between the switch blades 25 and 26 upward through the wire 21 and the field of the No. 1 motor to the movable blade on the arm 14, which in the position shown in Figure 2 is in contact with the fixed contact button 39, through which the current passes along, and through the armature $A^2$ of the No. 2 motor, and thence by means of the switch blades 33 and 34 through the field of the No. 2 motor, and to the ground at G. Thus in the position shown in Figure 2 the motors are coupled in series, and the motion of the car is in a forward direction, corresponding to the direction of movement of the lever 16, which it is assumed is on the forward platform of the car.

In order to move the car backward with the motors coupled in series, the lever is moved to the position shown in Figure 3, which is the first backward position, when the current in the armature leads is reversed, the current in the fields remaining the same, and the motor connections as to the series arrangement not being disturbed. The direction of current in this figure can be readily traced without being explained in detail. The reversal of current in the armatures is effected by means of the use of the collector shoe 7 in place of the collector shoe 6, the shoe 7 being connected to the opposite armature lead from the shoe 6, and being arranged by means of the switches, having the blades 19, 20, and 29 and 30, to maintain constant direction of the current in the fields while reversing that in the armatures.

In order to procure forward motion of the car with the motors in multiple, the lever is pushed to the second forward notch, as indicated in Figure 4, which keeps the shoe 6 in contact with the rail as it was shown in Figure 2, but also brings the shoe 8 in contact with the rail, and shifts the arm 14 so as to bring its movable contact into connection with the ground through the contact 38, and wire 37, the No. 1 motor thus being caused to drive in a forward direction, and having its current grounded through the wire 43, the contact 38, and the wire 37, while the No. 2 motor picks up its current through the shoe 8, and this passing through the armature as indicated, and the switch blades 33 and 34, and field $F^2$ is also grounded at G. Thus in this position the motors both drive in a forward direction, and each picks up its own current from the collector rail, and has its own direct connection to ground. The slotted connections of the shoes 6 and 7 thus come into play to render possible the bringing into contact of the shoe 8 against the rail without disturbing the contact of the shoe 6.

In order to procure a backward movement of the car with the motors in multiple connection, the lever is thrown to the second backward position, which brings the parts to the position in Figure 5, when a reversal of the current in the armature leads is procured in a manner similar to that which was procured in Figure 3 where the motors were in series, and which, the motors being in multiple, now produces a reversed movement of the motors, each getting its own current by a separate shoe from the collector rail. The direction of the current may be readily traced in Figure 5 without further explanation.

It will be observed that as shown in Figure 1, the movable arm 14 has its contact in connection with the ground by means of the fixed contact 40, and the wire 37. The purpose of this is to permit the No. 1 motor to be operated alone if there is anything out of gear with the No. 2 motor, by merely disconnecting the rod 15, in which condition of the apparatus it is obvious that the No. 1 motor can be used either to drive forward or backward by the oscillation of the lever 11, and the alternate contact of the shoes 6 and 7, the field of the No. 1 motor being grounded, as explained, with the oscillating lever 12 in the horizontal position, and the contact on the arm 14 in connection with the ground.

From the above description it will also be observed that the devices are so arranged that the circuit is broken in each case between the collector-shoe and the rail, before the switches are disconnected, thus making it possible to operate the switch without damage, since the arcing all takes place at the rail, where the movement of the car and circulation of air tend to minimize the destructive effect of it, and where no particular damage is done by such arcing as does occur.

An ordinary car has about eighty spring contact fingers and jaws for making and breaking circuit. It is one of the prime objects of this invention to dispense with these, since each individual make and break contact adds to the uncertainty of operation, as well as to the danger in manipulation and to the waste and destructive action due to the arcing.

Having thus described my invention, what I claim as new, and desire to secure by Letters Patent, is—

1. The combination in an electrical controlling apparatus; of a car, a motor for said car, means for maintaining constant direction of current through the field of said motor while reversing the current in the armature, a collector rail, and two collectors, with means for securing contact of the same in alternation to procure forward or backward movement of said car, substantially as described.

2. The combination of a plurality of current collectors co-operating with a common collector rail, of an armature connection to each of said collectors, and means for varying the position of the collectors relative to the collector rail, to shift connections and determine the direction of rotation of the armatures, substantially as described.

3. The combination with a car and two motors thereon, of means for changing the connection of said motors from series to multiple and vice versa, comprising a plurality of collectors, a common collector rail for said collectors, and means for securing contact of said collectors in alternation, whereby to obtain the series and multiple relation of the motors desired, substantially as described.

4. An electric controlling apparatus consisting in the combination of a car, a motor for said car, a collector rail, a plurality of collectors, means for securing alternate movement of said collectors to alternately engage the rail, the means for supporting said collectors, comprising an oscillating lever, and link suspension devices at opposite ends of said lever, substantially as described.

5. The combination with two sets of collectors mounted on separate pivoted supports, of common means for actuating both sets of collectors, the said means being constructed to secure contact of certain of said collectors in one position, and additional contact of other of said collectors in another position, substantially as described.

6. The combination with a car having two motors, of a collector rail, two pivoted lever arms on the car each carrying a contact plate on each end and operated by a single movable link, the heights of the supports for the pairs of contact plates being unequal so that the throw of the levers in either direction makes contact of the plates consecutively.

7. The combination with a pair of motor armatures and suitable electric connections and a collector rail, of two pairs of collector shoes mounted to rotate in unison to make contact with the rail, the respective pairs of collector shoes being at different distances from the rail and the shoes of each pair being also at different distances from the rail and from the other shoes, whereby each of the four shoes is at a different distance from the rail and they make contact in alternation, substantially as and for the purpose described.

In testimony whereof I have hereunto set my hand in the presence of two subscribing witnesses.

FRANK C. NEWELL.

Witnesses:
PAUL SYNNESTVEDT,
H. WELLS SMALLEY.